July 8, 1958   D. R. CLEMONS   2,842,652
METHODS OF MAKING ELECTRICAL CAPACITORS
Filed April 9, 1956
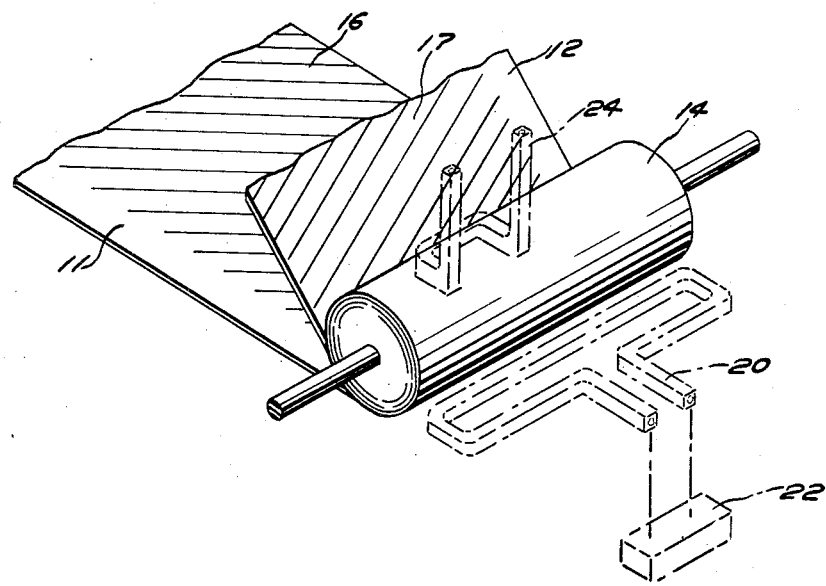
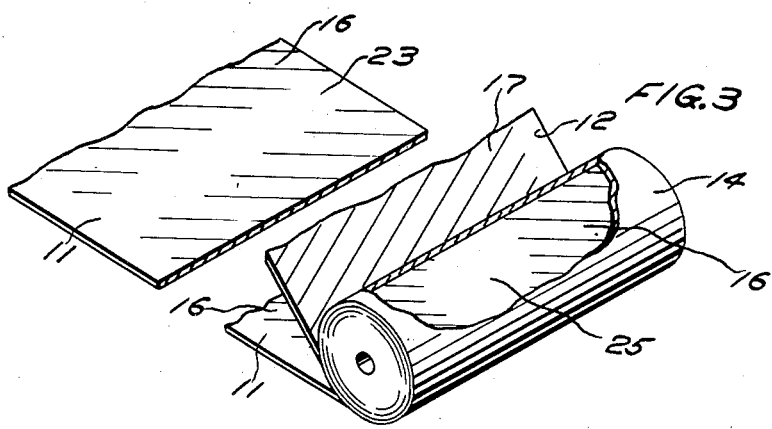
INVENTOR
D. R. CLEMONS
BY C. B. Hamilton
ATTORNEY

United States Patent Office 2,842,652
Patented July 8, 1958

2,842,652

METHODS OF MAKING ELECTRICAL CAPACITORS

Dale R. Clemons, Riverside, Ill., assignor to Western Electric Company, Incorporated, New York, N. Y., a corporation of New York Application April 9, 1956, Serial No. 577,045

6 Claims. (Cl. 219—19)

This invention relates to methods of making electrical capacitors, and more particularly to methods of making adjusted electrical capacitors.

An object of this invention is to provide new and improved methods of making adjusted electrical capacitors.

Another object of this invention is to provide a method of making electrical capacitors having metallized electrodes and adjusting them by vaporizing portions of the electrodes by induction heating.

In a method of making adjusted electrical capacitors illustrating certain features of the invention a plurality of dielectric strips having thereon metallized electrode layers are wound into a spiral roll. The capacitance of the roll is then adjusted to a desirable value by inductively heating the roll to vaporize areas of one or more of the metallized layers.

Other objects and advantages of the invention will become apparent by reference to the following detailed description and the accompanying drawing illustrating specific embodiments of the invention, in which Fig. 1 is a perspective view of a partially wound roll of dielectric strips showing the types of induction heating coils used in two embodiments of the invention;

Fig. 2 is a perspective view of a fragment of one of the dielectric strips showing a transverse area where the metallized electrode layer has been vaporized by the heating coil of one first embodiment of the invention; and Fig. 3 is a perspective view of the partially unwound roll having a portion broken away to show an area where a metallized layer has been vaporized by the heating coil of a second embodiment of the invention.

Referring now in detail to the drawing, a plurality of dielectric strips 11 and 12 are shown being wound into a cylindrical roll 14. The dielectric strips 11 and 12 are provided with metallized electrode portions or layers 16 and 17, respectively, whereby the dielectric strips 11 and 12 and the electrode layers 16 and 17 are in interleaved relationship. The electrode layer 16 is positioned on the dielectric strip 11 so as to be electrically connected to a terminal (not shown) in engagement with one end of the roll 14, and the electrode layer 17 is positioned on the dielectric strip 12 so as to be electrically connected to another terminal (not shown) in engagement with the other end of the roll 14. After the winding operation, glue of a desirable type is applied to the outer end of the dielectric strip 11 to secure the roll 14 in its cylindrical shape and prevent any unwinding of the roll.

Terminals (not shown) of a capacitance measuring device of a well-known type (not shown) are positioned in engagement with the ends of the roll 14 to thus determine the capacitance of the roll 14. With the capacitance of the roll 14 initially made deliberately above a predetermined value, an elongated water-cooled induction heating coil 20 is positioned adjacent to the roll 14 and high frequency current is supplied to the coil 20 from a power source 22, whereby the electrode layer 16 is heated and a transverse area 23 (Fig. 2) is vaporized from the dielectric strip 11. A transverse area (not shown) may also be vaporized from the electrode layer 17. That portion of the electrode layer 16 between the vaporized area 23 and the outer end of the strip 11 is now ineffective, since it is electrically disconnected from the electrode layer 16. If the capacitance of the roll 14 is still too high the above procedure is followed to vaporize other transverse areas of the electrode layers 16 and 17 to further reduce the capacitance of the roll 14 as described above.

In another embodiment of the invention an induction coil 24 having a generally circular or rectangular configuration at its lower end (Fig. 1) is used for vaporizing a generally circular area 25 (Fig. 3) of the electrode layer 16 to reduce the capacitance of the roll 14 to a predetermined desirable value. In this embodiment the reduction in capacitance of the roll 14 depends upon the actual area 25 of the electrode layer 16 which is vaporized from the dielectric strip 11, a similar area (not shown) also being vaporized from the electrode layer 17. If it is desirable, the capacitance measuring device (not shown) may remain connected to the ends of the roll 14 as the induction heating coil 24 heats the electrode layers to reduce the capacitance of the roll 14 whereby the capacitance measuring device indicates the capacitance as it is decreased. When the capacitance reaches the predetermined desirable value, the heating coil 24 is removed and terminals (not shown) are secured to the ends of the roll 14 and electrically connected to the electrode layers 16 and 17.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making electrical capacitors, comprising assembling a plurality of dielectric layers into a capacitor body, the dielectric layers having thereon thin metal electrode layers in interleaved relationship with said dielectric layers, and heating portions of the body to vaporize portions of said metal electrode layers to adjust the capacitance of said capacitor body.

2. The method of making electrical capacitors, comprising assembling a plurality of dielectric layers and electrode layers into interleaved relationship to form a capacitor body, one of said electrode layers being metallized to one of said dielectric layers, and inductively heating a portion of the capacitor body whereby a portion of the metallized electrode layer is evaporated from said one dielectric layer to reduce the effective area of said metallized electrode layer.

3. The method of making electrical capacitors, comprising assembling a plurality of dielectric strips into a capacitor body, the dielectric strips having metallized electrode layers thereon in interleaved relationship with said dielectric strips, and inductively heating a portion of the capacitor body in a manner to vaporize transverse areas of the electrode layers whereby portions of said electrode layers are electrically isolated from the rest of the electrode layers.

4. The method of making electrical capacitors, comprising winding a plurality of dielectric strips into a roll, said dielectric layers having thereon metallized electrode layers, and inductively heating portions of the roll to vaporize portions of said metallized electrode layers to adjust the capacitor of the roll.

5. The method of making electrical capacitors, comprising winding a plurality of dielectric strips into a roll, the dielectric strips having metallized electrode layers thereon in interleaved relationship with said dielectric layers, and inductively heating a portion of the roll in a manner to vaporize transverse areas of the electrode layers whereby portions of the electrode layers are electrically isolated from the rest of said electrode layers.

6. The method of making electrical capacitors, comprising winding a plurality of interleaved dielectric and electrode layers into a roll, one of said electrode layers being metallized onto one of the dielectric layers, and inductively heating portions of the electrode layers in a manner to vaporize portions of said metallized electrode layer to adjust the capacitance of the roll.

References Cited in the file of this patent

UNITED STATES PATENTS

| | | |
|---|---|---|
| 2,024,906 | Bennett | Dec. 17, 1935 |
| 2,603,737 | Erdman | July 15, 1952 |